(12) United States Patent
Mondinelli et al.

(10) Patent No.: US 12,044,321 B2
(45) Date of Patent: Jul. 23, 2024

(54) MULTIFUNCTION VALVE FOR FUEL CELL AUTOMOTIVE SYSTEMS

(71) Applicant: OMB SALERI S.P.A.—SOCIETA' BENEFIT, Brescia (IT)

(72) Inventors: Francesco Mondinelli, Brescia (IT); Renato Santulli, Brescia (IT)

(73) Assignee: SOCIETA' BENEFIT, Brescia (IT)

( * ) Notice: Subject to any disclaimer, the term of this patent is extended or adjusted under 35 U.S.C. 154(b) by 106 days.

(21) Appl. No.: 17/920,871

(22) PCT Filed: Apr. 22, 2021

(86) PCT No.: PCT/IB2021/053319
§ 371 (c)(1),
(2) Date: Oct. 24, 2022

(87) PCT Pub. No.: WO2021/214701
PCT Pub. Date: Oct. 28, 2021

(65) Prior Publication Data
US 2023/0184343 A1 Jun. 15, 2023

(30) Foreign Application Priority Data
Apr. 24, 2020 (IT) .................... 102020000008932

(51) Int. Cl.
*F16K 11/22* (2006.01)
*F16K 27/02* (2006.01)
*F17C 13/04* (2006.01)

(52) U.S. Cl.
CPC .......... *F16K 11/22* (2013.01); *F16K 27/0263* (2013.01); *F17C 13/04* (2013.01); *F17C 2205/0326* (2013.01); *F17C 2205/0335* (2013.01); *F17C 2221/012* (2013.01); *F17C 2250/0439* (2013.01); *F17C 2270/0178* (2013.01); *F17C 2270/0184* (2013.01)

(58) Field of Classification Search
None
See application file for complete search history.

(56) References Cited

U.S. PATENT DOCUMENTS

| 10,260,681 | B2* | 4/2019 | Hanada ................... F17C 13/04 |
| 2002/0040729 | A1* | 4/2002 | Takeda .................... F16K 1/307 |
| | | | 137/74 |
| 2004/0154668 | A1* | 8/2004 | Larsen .................. F16K 17/003 |
| | | | 137/505.25 |
| 2005/0103382 | A1* | 5/2005 | Carter ................... F16K 31/406 |
| | | | 137/487.5 |
| 2019/0170260 | A1 | 6/2019 | Hausmann |
| 2019/0170303 | A1 | 6/2019 | Albert et al. |

FOREIGN PATENT DOCUMENTS

| DE | 102016008059 A1 | 5/2017 |
| DE | 102016008079 A1 | 1/2018 |
| DE | 102016008106 A1 | 1/2018 |
| DE | 102017213524 A1 * | 2/2019 |

OTHER PUBLICATIONS

International Search Report for International Patent Application No. PCT/IB2021/053319, mailed Jun. 18, 2021.

* cited by examiner

*Primary Examiner* — Angelisa L. Hicks
(74) *Attorney, Agent, or Firm* — Armstrong Teasdale LLP (57) ABSTRACT

A multifunction valve for a flange of a high pressure hydrogen tank for a fuel cell automotive system having a one-piece ejector body applicable to a head surface of a valve body is provided.

11 Claims, 8 Drawing Sheets

MULTIFUNCTION VALVE FOR FUEL CELL AUTOMOTIVE SYSTEMS

CROSS-REFERENCE TO RELATED APPLICATIONS

This application is a National Phase Application of PCT International Application No. PCT/IB2021/053319, having an International Filing Date of Apr. 22, 2021, which claims priority to Italian Application No. 102020000008932, filed Apr. 24, 2020, each of which is hereby incorporated by reference in its entirety.

FIELD OF THE INVENTION

The present invention belongs to the field of valves for fuel cell automotive systems, and in particular, to the field of valves for managing the hydrogen flow between a tank and the fuel cells. In particular, the present invention relates to a multifunction valve intended to be applied to the tank, usually referred to as an OTV (On-Tank-Valve) or GHU (Gas-Handling-Unit).

BACKGROUND OF THE INVENTION

In a fuel cell automotive system, hydrogen is stored in a high pressure tank, typically 700 or 350 bars. A multifunction valve, usually referred to as an OTV (On-Tank-Valve) or GHU (Gas-Handling-Unit) is applied to a flange applied to the neck of the tank, allowing hydrogen to be introduced into the tank (refilling function) and to come out towards the user devices downstream (fueling function).

The OTV valve is further provided with some safety devices, such as a temperature sensor, for detecting the temperature of the gas in the tank, and a thermal safety device, capable of suddenly releasing the hydrogen contained in the tank in the case of hazardous events, such as a fire, for example.

The Applicant has been producing and marketing an OTV valve having the aforesaid features for some time now, with considerable success on the market.

Recently, however, the need has arisen to apply an OTV valve, having the above safety devices and functions, to tanks having lower capacities, for example in order to provide a plurality of small tanks on board the vehicle to replace a single large tank.

This results in a reduction in size of the tank neck and therefore a considerable difficulty or even impossibility of applying the OTV valves known today.

SUMMARY OF THE INVENTION

It is the object of the present invention to provide an OTV valve, which meets the field needs and overcomes the above problem.

Such an object is achieved by an OW valve as described and claimed herein. Advantageous embodiments of the present invention are also described.

BRIEF DESCRIPTION OF THE DRAWINGS

The features and advantages of the OTV valve according to the present invention will become apparent from the following description, given by way of a non-limiting example, in accordance with the figures in the accompanying drawings, in which.

DETAILED DESCRIPTION

Figure 1:
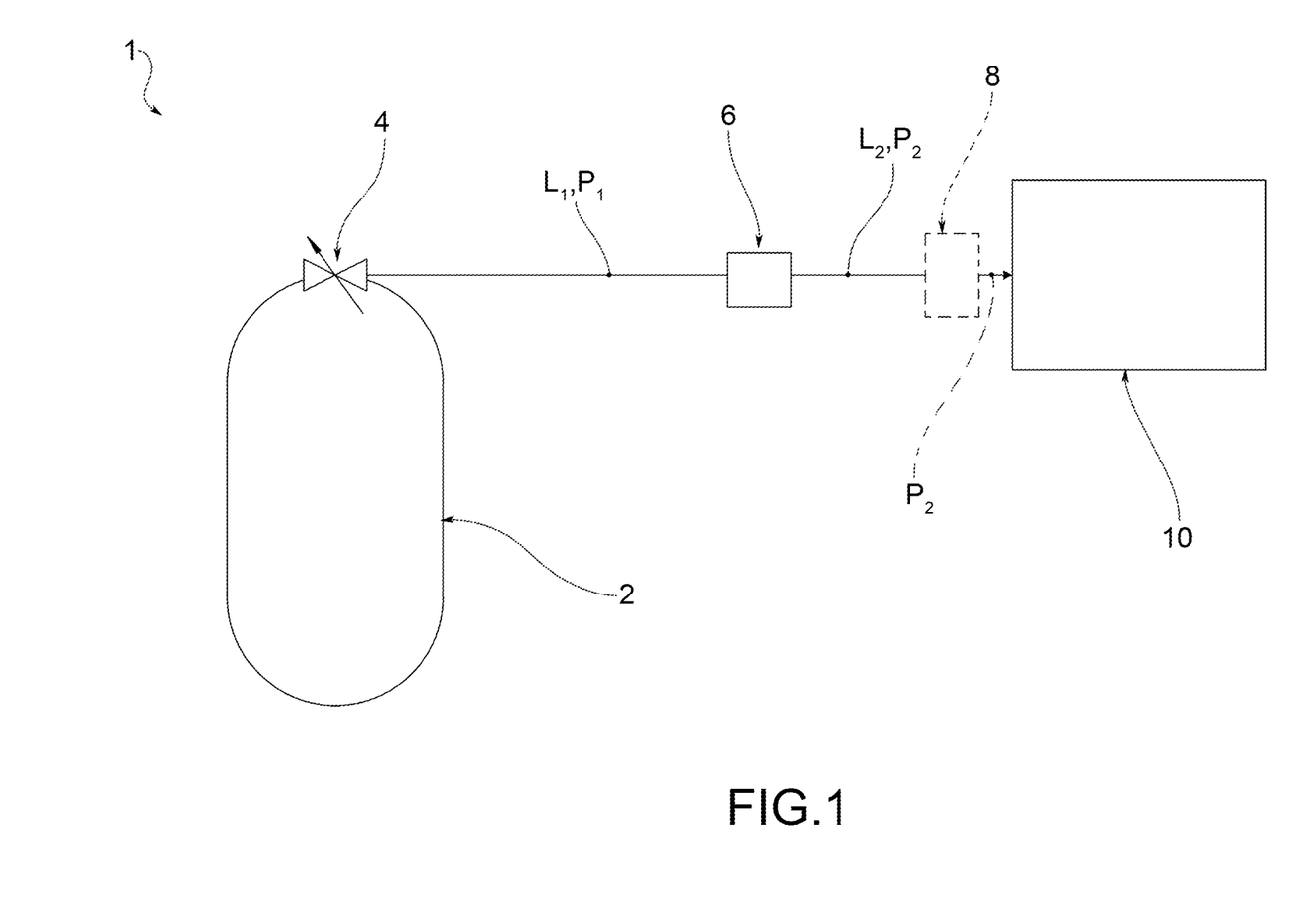
FIG. 1 is a diagram of a fuel cell automotive system for vehicles.
Figure 2A:
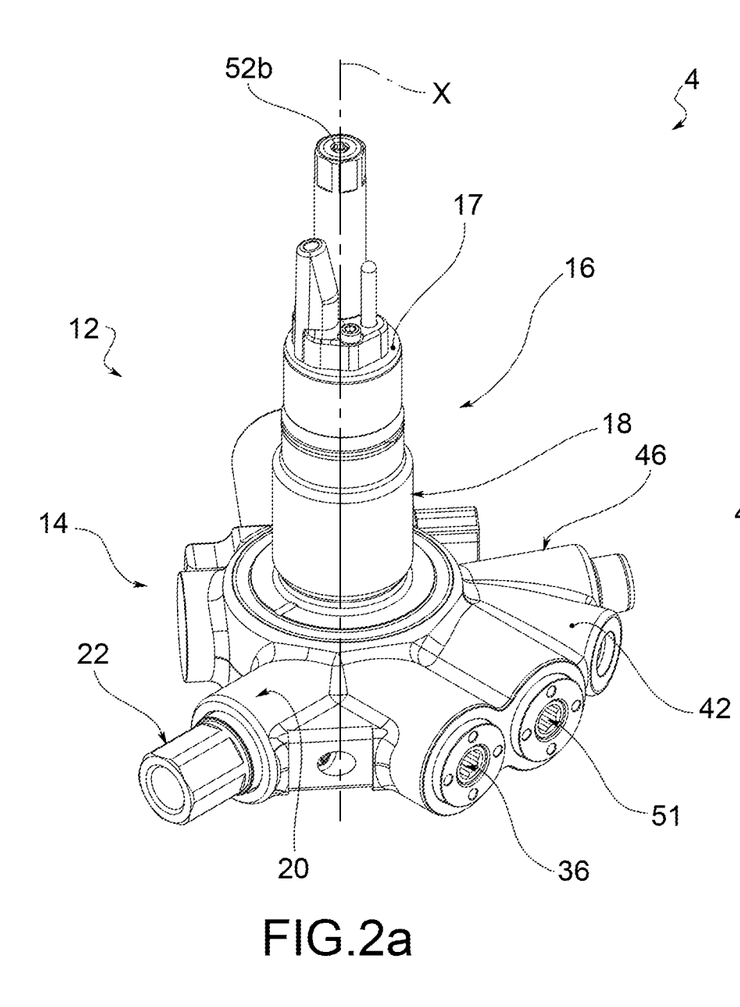
FIGS. 2a and 2b depict a multifunction valve according to an embodiment of the present invention.
Figure 2B:
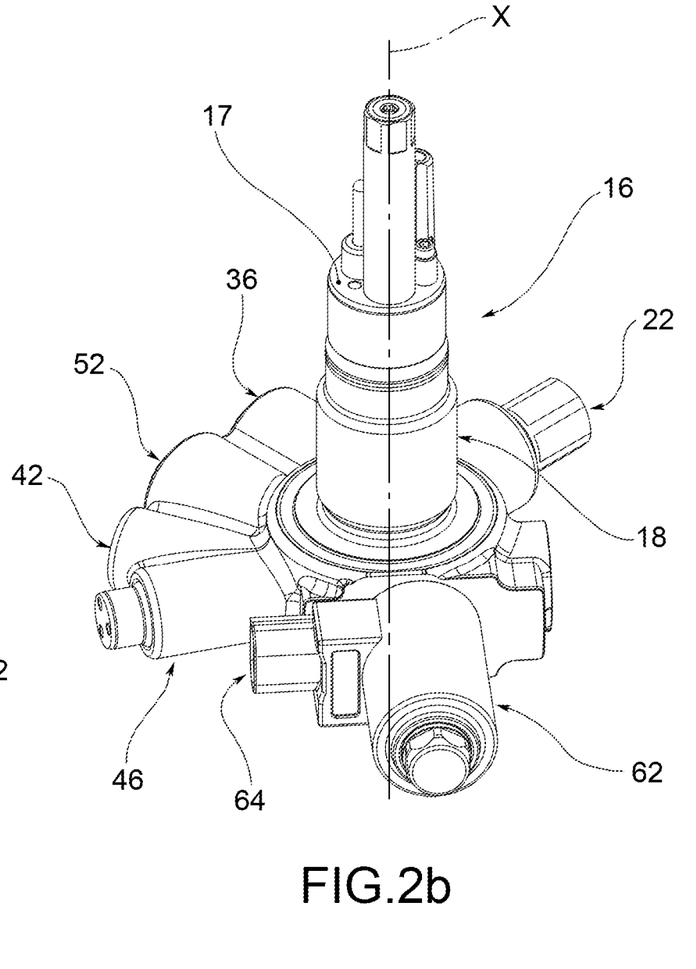
Figure 3:
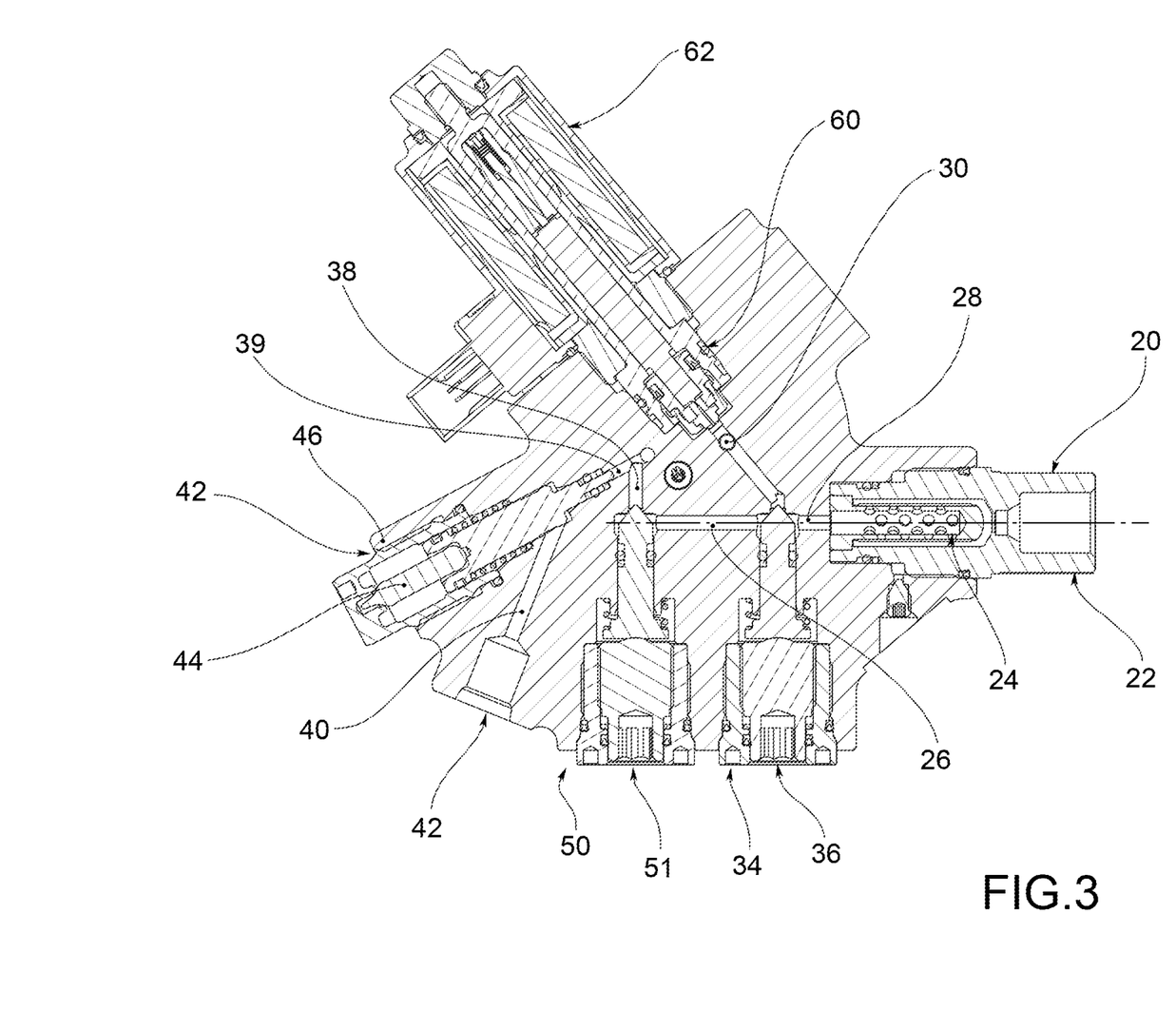
FIG. 3 is a cross-sectional view of a main portion of the valve according to an embodiment of the present invention.
Figure 4:
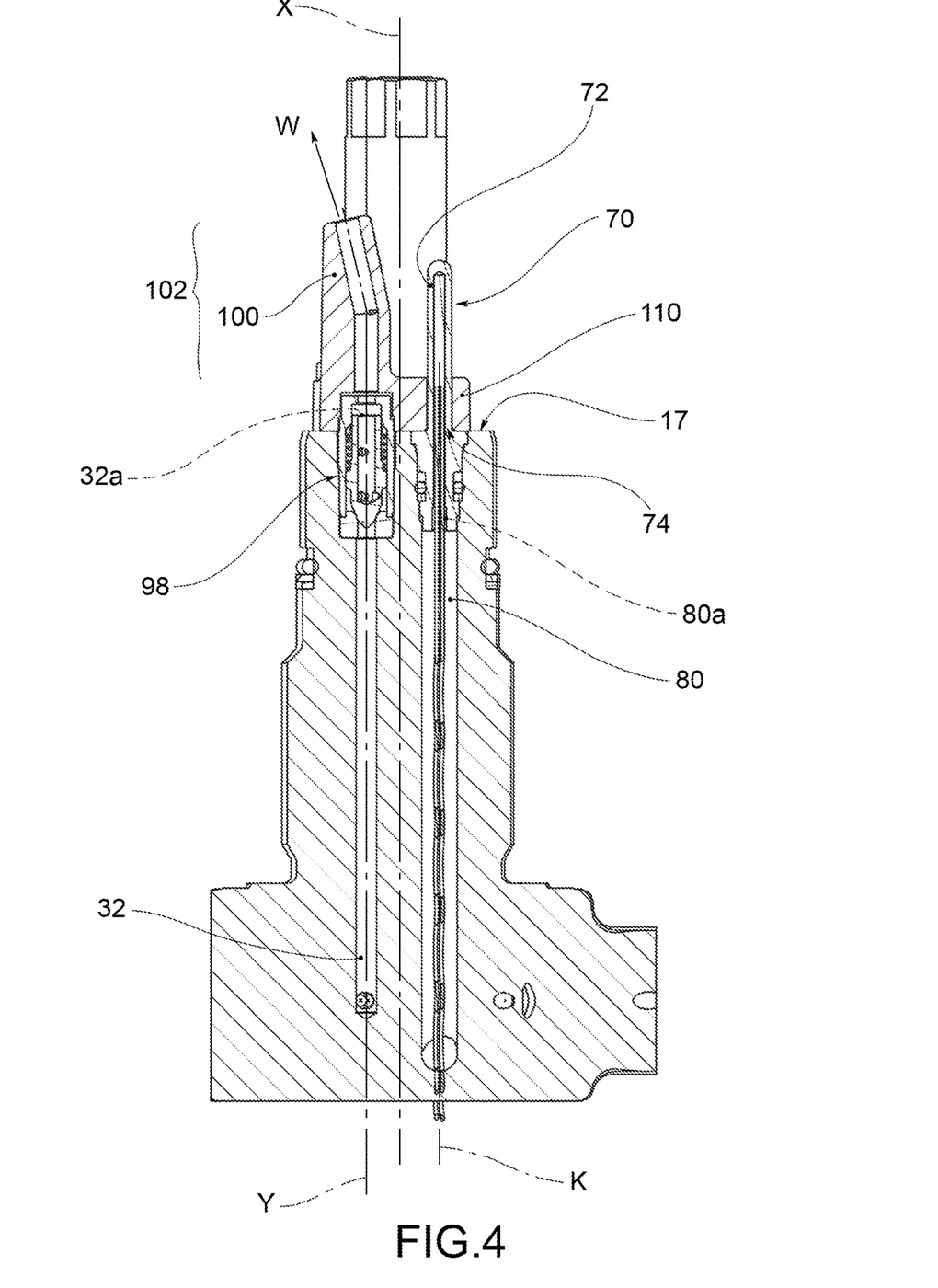
FIG. 4 is a longitudinal sectional view of the valve according to an embodiment of the present invention.
Figure 5:
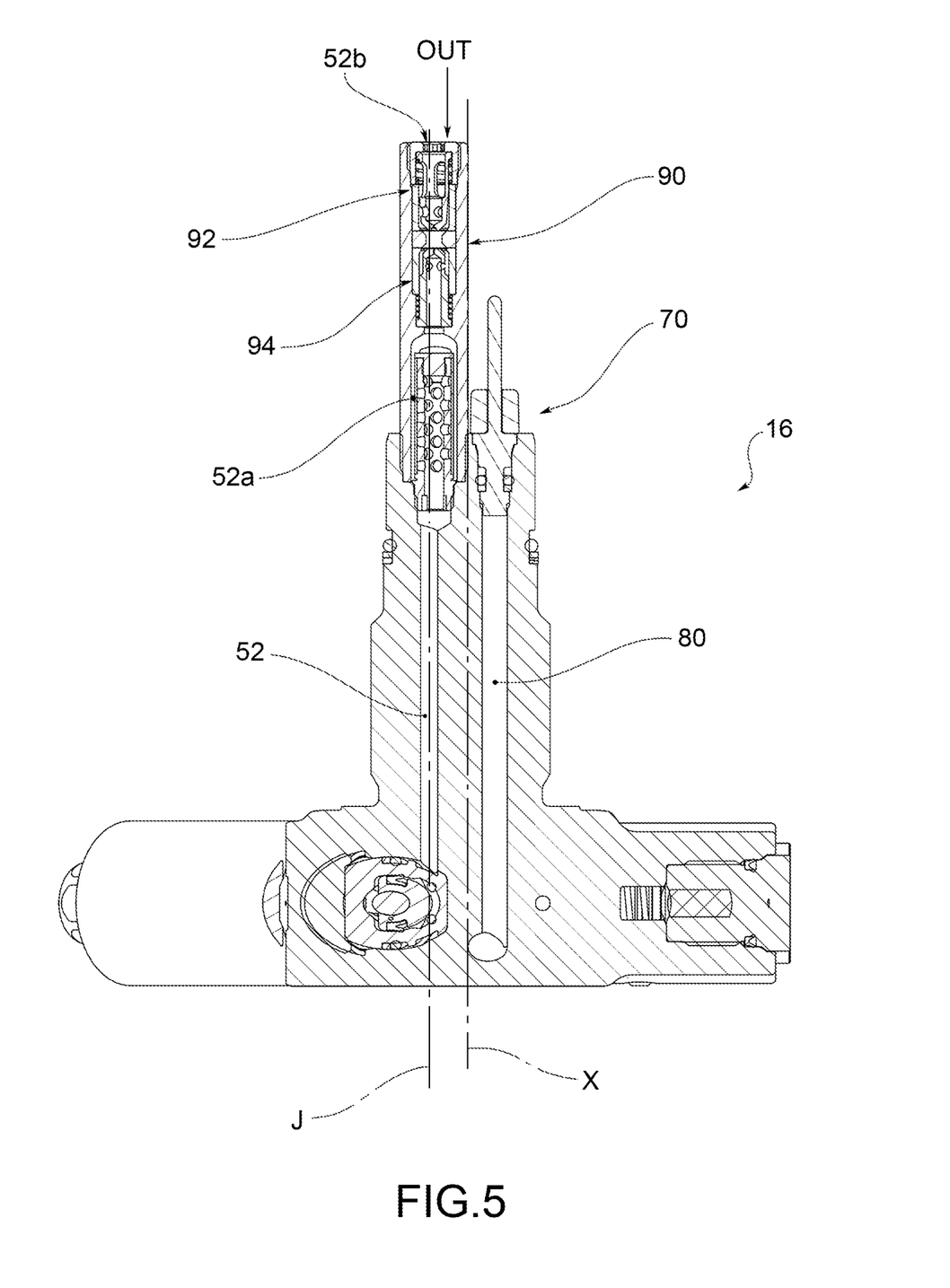
FIG. 5 is a further longitudinal sectional view of the valve according to an embodiment of the present invention.
Figure 6:
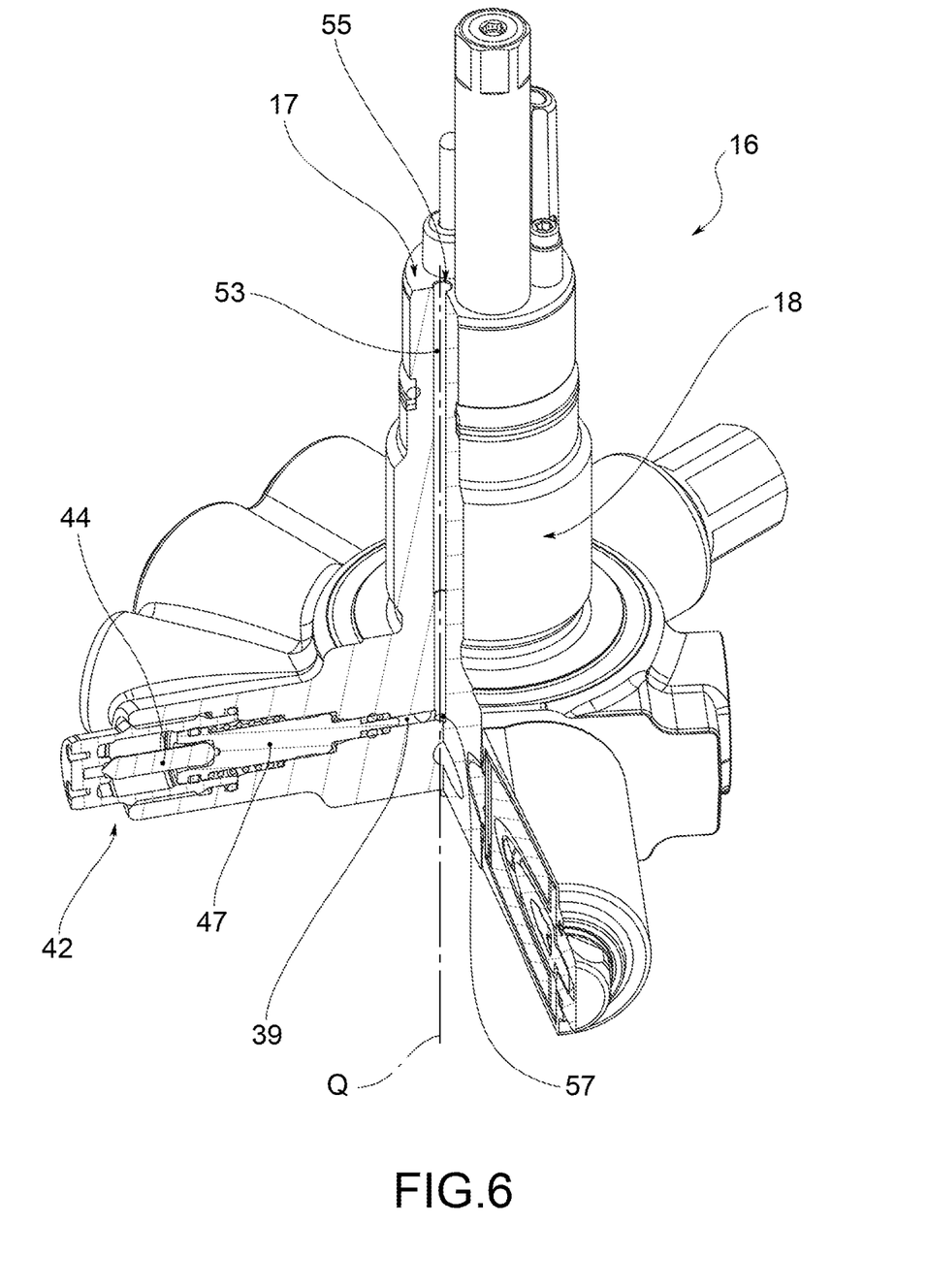
FIG. 6 is a further longitudinal sectional view of the valve according to an embodiment of the present invention.
Figure 7A:
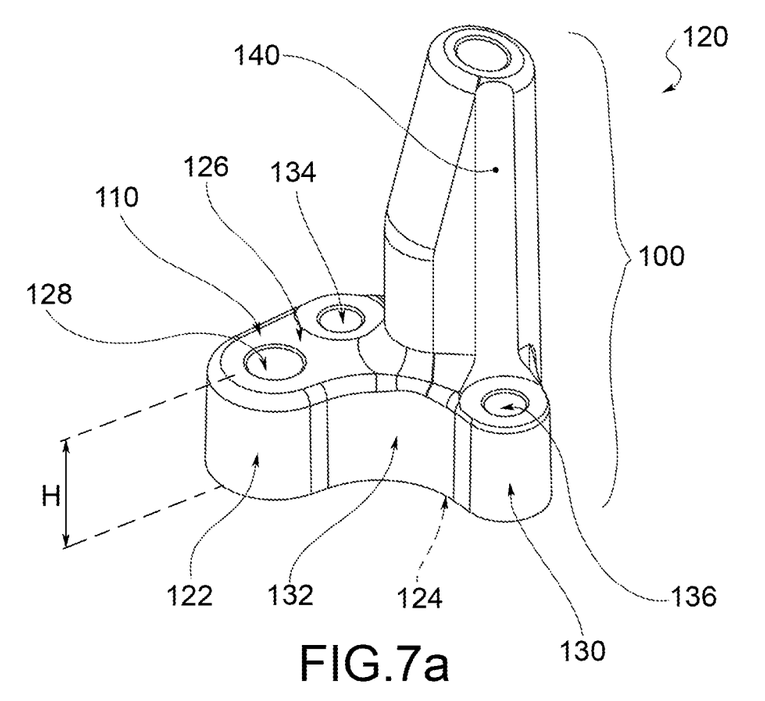
FIGS. 7a and 7b depict an ejector body according to an embodiment of the present invention.
Figure 7B:
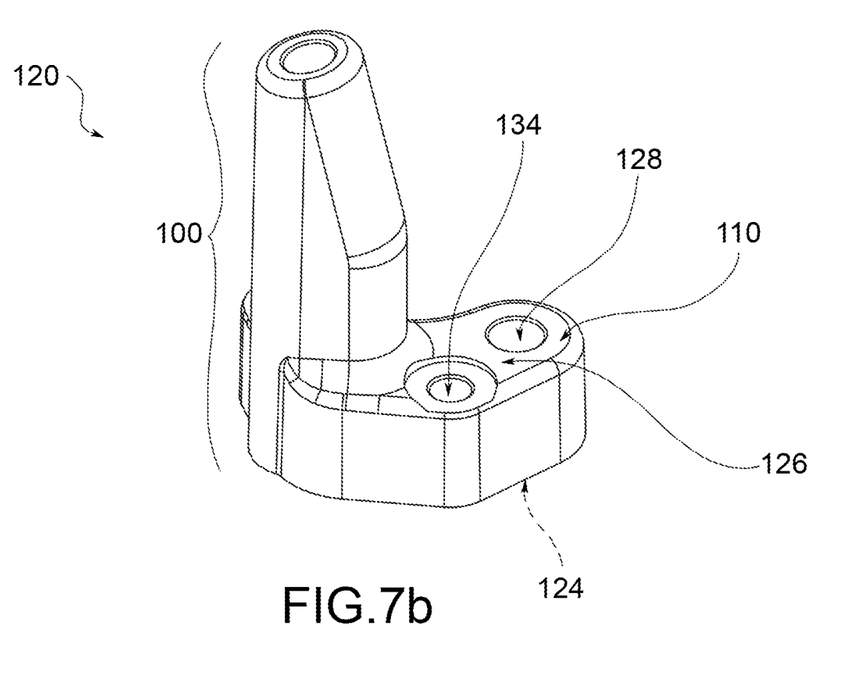
Figure 8:
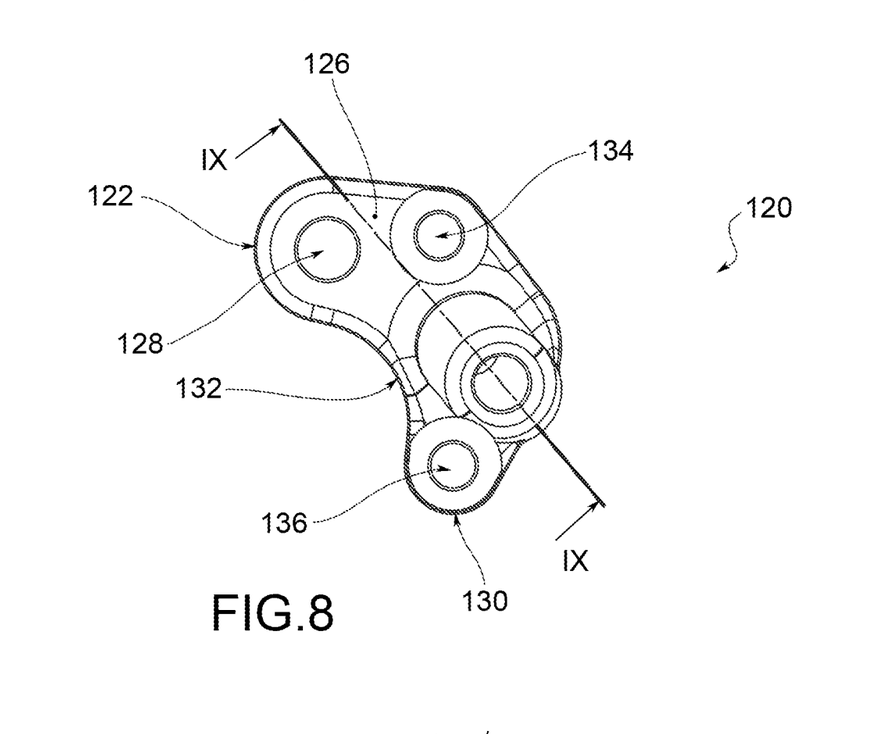
FIG. 8 is a plan view of the ejector body in FIGS. 7a and 7b.
Figure 9:
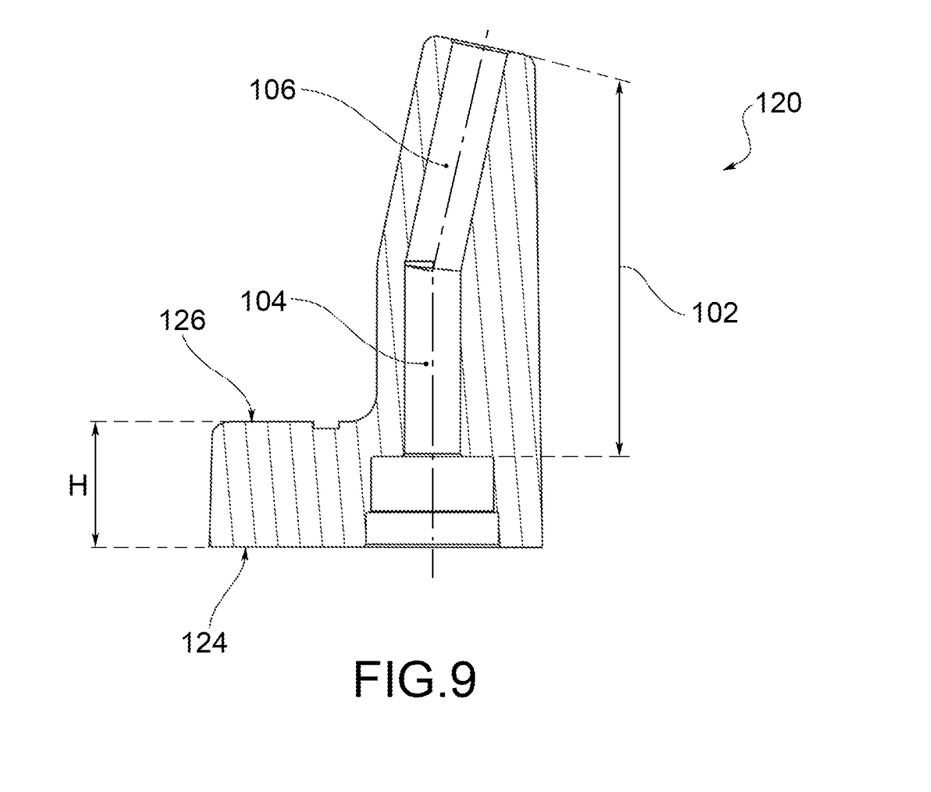
FIG. 9 is a sectional view of the ejector body in FIGS. 7a and 7b, according to the section plane IX-IX in FIG. 8.

With reference to the accompanying figures, reference numeral 1 indicates a fuel cell automotive system as a whole, comprising a tank 2 for containing high pressure hydrogen (the maximum pressure can reach 350, 700 or even 1000 bars), a multifunction valve 4 (OTV valve) applied to a flange of the tank 2, a pressure reducing valve 6 (HPR valve), a high pressure line L1 with high pressure P1, connecting the OTV valve 4 to the HPR valve 6, a fuel cell unit 10 and a low pressure line L2 with low pressure P2, connecting the HPR valve 6 to the fuel cell unit 10. System 1 preferably comprises accessory valves 8 which intercept the low pressure line L2.

The OTV 4 valve comprises a valve body 12 made in a single piece and generally of aluminum, for example, comprising a main portion 14 and an attachment portion 16. The attachment portion 16 mainly extends along an attachment axis X and has a head surface 17, lying on an imaginary plane orthogonal to the attachment axis X, for example, at a distal end from the main portion 14. Typically, the head surface 17 is circular.

The attachment portion 16 comprises an engagement section 18, having an outer cylindrical surface coaxial to the attachment axis X, threaded to be screwed into the hole of the flange of tank 2.

The main portion 14 preferably has a main extension on an imaginary plane, orthogonal to the attachment axis X.

According to an embodiment, the main portion 14 comprises an inlet/outlet port 20, intended for the introduction of hydrogen; preferably, an inlet/outlet fitting 22 provided with an inlet/outlet filter 24, for example, is inserted into the inlet/outlet port 20. The main portion 14 further has an inner inlet/outlet duct 26, in communication with the inlet/outlet port 24.

Furthermore, the main portion 14 preferably has an inlet/outlet branch 28 internally, which branches out from the inlet/outlet duct 26 and is in turn in communication, through an inlet port 30, with an inlet duct 32 having an extension along an inlet axis Y, preferably parallel to the attachment axis X and spaced apart therefrom. The inlet duct 32 opens out onto the head surface 17 of the attachment portion 16.

The OTV valve 4 is further provided with a first manually-operated shut-off valve 34 (MV valve), normally open and operating between the inlet/outlet duct 26 and the inlet/outlet branch 28. The MV valve 34 is externally operable through a first plug 36 on the main portion 14.

Furthermore, the main portion 14 preferably has an inner by-pass duct 38, which branches out from the inlet/outlet duct 26, downstream of the MV valve 36, a vent duct 39, in which the inner by-pass duct 38 converges, and a terminal vent duct 40, in communication with the external environment through a vent port 42 of the main portion 14.

Furthermore, the OTV valve 4 preferably comprises a second shut-off valve 50 (BV valve), which is manually operable through a third plug 51 of the main portion 14, operating between the inlet/outlet duct 26 and the inner by-pass duct 38.

According to a preferred embodiment, the OTV valve 4 is further provided with a thermal safety device 42 (TPRD device) arranged in the main portion 14. The TPRD device 42 is provided with a breakable bulb 44, for example, which is insertable through a second port 46 of the main portion 14, and with a piston 47. The TPRD device 42, normally closed, operates between the vent duct 39 and the terminal vent duct 40.

The valve body 12 further has a thermal safety duct 53, preferably obtained in the attachment portion 16, having an extension along a safety axis Q, parallel to the attachment axis X and spaced apart therefrom. The thermal safety duct 53 opens out at one end with a thermal safety port 55 on the head surface 17 of the attachment portion 16, and at the other end, is in communication with the vent duct 39 through a passage 57.

The valve body 12 further has an outlet duct 52, preferably obtained in the attachment portion 16, having an extension along an outlet axis J, parallel to the attachment axis X and spaced apart therefrom. The outlet duct 52 opens out at one end on the head surface 17 of the attachment portion 16, and at the other end is in communication with the inlet/outlet branch 28 of the main portion 14.

An opening/closing valve 60 (SOV valve), which is electrically operable, preferably by means of a solenoid 62 provided with a plug 64 for the electrical supply and transmission of signals, operates between the outlet duct 52 and the inlet/outlet branch 28.

Furthermore, the OTV valve 4 comprises a temperature detection device 70 (T-sensor device), comprising a protective cap 72, protruding axially from the head surface 17, and a temperature sensor 74, placed inside the cap 72 and protruding from the head surface 17.

Furthermore, the valve body 12 has a sensor duct 80 obtained in the attachment portion 16, which extends along a sensor axis K, preferably parallel to the attachment axis X and spaced apart therefrom. At a first end, the sensor duct 80 opens out on the head surface 17 of the attachment portion 16, while the other end is in the main portion 14. The temperature sensor 74 is accommodated in the sensor duct 80 and is operatively connected to the plug 64 of the SOV valve 62 for the electrical supply and external transmission of the signal.

Therefore, the outlet duct 52 with an outlet port 52a, the inlet duct 32 with an inlet port 32a, the sensor duct 80 with a sensor port 80a, and the thermal safety duct 53 with a thermal safety port 55 appear on the head surface 17.

An internally hollow outlet fitting 90 is applied to the outlet duct 52, having an extension along the outlet axis J and preferably offset therefrom, so as to approach the attachment axis X, and ending with the terminal port 52b.

The outlet fitting 90 preferably comprises a flow excess valve 92 (EFV valve), suitable for closing the passage of hydrogen if the flow rate exceeds a preset threshold value, and preferably, an outlet check valve 94 (NRV OUT valve), normally open, suitable for closing the passage of hydrogen if the flow goes towards the tank. Furthermore, an outlet filter 96 is preferably arranged between the outlet duct 52 and the terminal port 52b, for example held at the attachment portion 16 by the outlet fitting 90.

By taking into account the hydrogen direction from the tank towards the outlet (OUT direction), the EFV valve 92 is preferably arranged upstream of the NRV OUT valve 94, which in turn is upstream of the outlet filter 96.

An inlet check valve 98 (NRV IN) is applied to the inlet duct 32, being normally closed and suitable for preventing hydrogen from returning from the tank towards the inlet/outlet duct 26.

Furthermore, an ejector tube 100 is applied to the inlet duct 32, being fixed to the head surface 17 of the attachment portion 16.

The ejector tube 100 is provided internally with an ejector duct 102, comprising an upstream section 104, parallel to the inlet axis Y and preferably coaxial thereto, and a downstream section 106, inclined with respect to the inlet axis Y and divergent in a centrifugal direction, so that the incoming hydrogen flow, during the refilling operation, is directed towards the lateral wall of the tank.

The NRV IN valve 98 is preferably kept applied to the inlet duct 32 by the ejector tube 100.

Finally, the cap 72 of the temperature detection device 70 is kept applied to the sensor duct 80 by means of an annular stop element 110 fitted onto the cap 72 and secured to the head surface 17 of the attachment portion 16.

The ejector tube 100 and the stop element 110 are made in a single piece, preferably of aluminum, and form an ejector body 120 which is applicable to the head surface 17 of the attachment portion 16.

In particular, the ejector body 120 comprises an ejector base 122, having a predetermined height H between a lower surface 124 and an upper surface 126; the lower surface 124 is intended to abut against the head surface 17 of the attachment portion 16, while the ejector tube 100 protrudes axially from the upper surface 126.

The stop element 110 is a portion of the ejector base 122 and is provided with a through hole 128 between the lower surface 124 and the upper surface 126, suitable for being crossed by the cap 72 of the temperature detection device 70.

The ejector base 122 further has a lateral surface 130, between the lower surface 124 and the upper surface 126, forming the profile of said ejector base 122, and shaped so as to be contained inside the head surface 17 of the attachment portion 16, leaving the inlet port 32a and the thermal safety port 55 uncovered.

In particular, the lateral surface 130 preferably has a loop 132 in which, when the ejector body 120 is applied to the attachment portion 16, the shape of the outlet fitting 90 is accommodated at least partially. In other words, the loop 132 forms a recess which allows the arrangement of the outlet fitting 90 without structural interference with the ejector body 120.

The ejector body 120 further comprises a pair of fixing holes 134, 136, passing between the lower surface 124 and the upper surface 126, for the insertion of the screws for connecting the ejector body 120 to the attachment portion 16. Said fixing holes 134, 136 are preferably arranged at the sides of the ejector tube 100.

Furthermore, said ejector tube 100 has an axial groove 140 externally, extending from the top of the ejector tube 100 to the upper surface 126 of the ejector base 122, at at least one of said fixing holes 134, 136 to allow the insertion of a screw fixing tool.

According to a construction variant (not shown), the outlet fitting is integrated into the ejector body, thus also covering the outlet port.

According to a further variant (not shown), the ejector body integrates the ejector tube for the inlet duct and the outlet fitting for the outlet duct, while the sensor port remains uncovered; therefore, in such a variant, the ejector body does not integrate the stop element.

According to a yet further variant (not shown), the ejector body integrates the stop element for the sensor port and the outlet fitting for the outlet duct, while the inlet port remains uncovered; therefore, in such a variant, the ejector body does not integrate the ejector tube.

Innovatively, the OTV valve according to the present invention meets the field needs and solves the above drawback.

In fact, the ejector body allows to reduce the space occupied by the ejector tube, the stop element, and the fixing holes separately.

It is apparent that, in order to meet contingent needs, those skilled in the art could make changes to the above-described OTV valve, all contained in the scope of protection as defined by the following claims.

The invention claimed is:

1. A multifunction valve for a flange of a high pressure hydrogen tank for a fuel cell automotive system, comprising:
    a valve body comprising a main portion and an attachment portion that extends from the main portion along an attachment axis (X) and ends with a head surface, wherein:
        said attachment portion internally has comprises:
            an inlet duct ending, at one end distal from the main portion, with an inlet port on the head surface;
            an outlet duct ending, at one end distal from the main portion, with an outlet port on the head surface;
            a sensor duct ending, at one end distal from the main portion, with a sensor port on the head surface; and
            a thermal safety duct ending, at one end distal from the main portion, with a thermal safety port on the head surface;
    a one-piece ejector body, applicable to the head surface of the attachment portion to leave the outlet port uncovered, comprising:
        an ejector base having a lateral surface shaped so as to be contained in the head surface of the attachment portion, comprising an annular stop element, provided with a hole which, when the one-piece ejector body is applied to the attachment portion, is aligned with the sensor port;
        an ejector tube, axially protruding from the ejector base, provided internally with an ejector duct which, when the one-piece ejector body is applied to the attachment portion, is in fluid communication with the inlet duct through the inlet port; and
        a temperature detection device, comprising a protective cap, protruding axially from the sensor port on the head surface, and a temperature sensor, located inside the protective cap, wherein the protective cap passes through the hole of the annular stop element of the one-piece ejector body.

2. The multifunction valve of claim 1, wherein the attachment portion comprises an engagement section having a cylindrical outer surface coaxial to the attachment axis (X), threaded for screwing to the flange of the high pressure hydrogen tank.

3. The multifunction valve of claim 1, wherein the ejector duct comprises an upstream section, parallel to an inlet axis (Y), and a downstream section, inclined with respect to the inlet axis (Y) and divergent in centrifugal direction.

4. The multifunction valve of claim 1, comprising an inlet check valve, operating along the inlet duct and inserted in the inlet duct through the outlet port, the inlet check valve being held in position by said ejector tube.

5. The multifunction valve of claim 1, comprising an outlet fitting applied to the outlet port, having extension along an outlet axis (J) and ending with a terminal port.

6. The multifunction valve of claim 5, wherein in the outlet fitting a normally open excess flow valve and a normally open outlet check valve are accommodated.

7. The multifunction valve of claim 5, wherein the lateral surface of the ejector base has a loop, and wherein, when the one-piece ejector body is applied to the attachment portion, a profile of the outlet fitting is at least partially accommodated in said loop.

8. The multifunction valve of claim 1, wherein the one-piece ejector body comprises at least one fixing hole, passing through a thickness of the ejector base, for inserting connecting screws of the one-piece ejector body to the attachment portion.

9. The multifunction valve of claim 8, wherein the ejector tube externally comprises an axial groove extending from a top of the ejector tube to the ejector base, at said at least one fixing hole to allow insertion of a screw fixing tool.

10. The multifunction valve of claim 1, wherein the one-piece ejector body also leaves the thermal safety port uncovered.

11. The multifunction valve of claim 1, further comprising a thermal safety device which that intercepts the thermal safety duct.

* * * * *